United States Patent Office 2,961,453
Patented Nov. 22, 1960

2,961,453

PRODUCTION OF ORGANO-SILANES

Geoffrey John Sleddon, Seamill, West Kilbride, Scotland, assignor to Imperial Chemical Industries Limited, London, England, a corporation of Great Britain No Drawing. Filed Sept. 10, 1958, Ser. No. 760,069

Claims priority, application Great Britain Sept. 13, 1957

12 Claims. (Cl. 260—448.2)

This invention relates to a new and improved method for the production of organosilicon compounds and more particularly for the production of organosilanes.

Organosilicon compounds such as organosilanes can be prepared by various methods such as for example direct reaction of silicon with an alkyl halide or reaction of silicon halides with Grignard reagents. It has also been proposed to prepare such compounds by alkylating silicon tetrafluoride with aluminium alkyls. Another method which has been proposed is to react a silane with an olefine while a further method proposed for preparing certain of these compounds is to react a silica with a dibutyl ether solution of ethyl magnesium bromide.

According to the present invention a new and improved process for the production of alkyl silanes comprises reacting together a siliceous material, as hereinafter defined, and an alkali metal halide complex of an organo aluminium halide having the general formula $MX.RAlY_2$ where M is an alkali metal, R is a methyl or ethyl group and X and Y, which may be the same or different, are chlorine, bromine or iodine.

By the term "a siliceous material" as used throughout this specification, we mean a substance selected from the group consisting of (a) free silicas, (b) natural and synthetic silicates and industrial residues obtained by the extraction of materials other than silica from natural silicates and (c) polysiloxanes.

Free silicas which may be used include silica gels, fume silicas such as the "Aerosils" and diatomaceous earths such as kieselguhr. Suitable silicates include bentonite, talc, china clay, albite felspar, olivine, wollastonite, mica, chrysotile asbestos, commercial anhydrous sodium silicates and the like. Suitable polysiloxanes include polysiloxane oils, resins, gums, elastomers and the like.

The alkali metal halide complex may be prepared prior to the reaction or may be prepared in situ. Suitable substances include the complexes of the chlorides, bromides, and iodides of sodium, potassium, lithium and caesium with methyl and ethyl aluminium dichlorides, dibromides and diiodides.

The temperature at which the reaction may be carried out can vary within wide limits. Thus for polysiloxanes, temperatures above 150° C. are suitable while for the other forms of silica which may be used higher temperatures are desirable, for example, 200 to 400° C. It is, however, preferred to operate at temperatures of the order of 300 to 360° C. The reaction may be carried out at atmospheric, super-atmospheric or sub-atmospheric pressures. Normally little advantage, if any, is gained by operating under sub-atmospheric pressures and it is in most cases preferable to operate at atmospheric pressure.

The relative proportions of the aluminium complex to the siliceous material used in the process of our invention may vary within wide limits. For most purposes, proportions giving an atomic ratio of silicon to aluminium of from 0.13:1.0 to 1.0:1.0 are eminently satisfactory. It is, however, preferred to operate within the range 0.2:1.0 to 0.5:1.0.

Our invention is further illustrated by the following examples in which all parts and percentages are by weight.

Example 1

A complex of sodium chloride and ethyl aluminium dichloride was prepared by adding dried sodium chloride to ethyl aluminium dichloride under nitrogen and heating at 140° C. while agitating until a homogeneous liquid was formed.

112 parts of this complex were reacted with 10 parts of a silica gel by heating at 320° C. for 3 hours in a vessel equipped for distillation. During this period, 16.4 parts of a liquid consisting almost entirely of tetraethylsilane distilled off and were collected.

Example 2

8 parts of a dried residue obtained by extracting alumina from an aluminosilicate and which contained 78% silica were reacted with 81.4 parts of the aluminium complex used in Example 1 by heating together for 4 hours at temperatures rising to 340° C. During this period, 12.5 parts of tetraethylsilane were collected.

Example 3

7.6 parts of bentonite and 76.5 parts of the complex used in Example 1 were heated together at 360° C. for 2 hours. 6.1 parts of tetraethylsilane were distilled off and collected.

Example 4

17.5 parts of a complex of lithium chloride and ethyl aluminium dichloride and 1.5 parts of dried silica gel were heated together at 360° C. for 4 hours. During this period, 2 parts of tetraethylsilane were distilled and collected.

Example 5

46 parts of a complex of sodium chloride and methyl aluminium dichloride and 4 parts of dried silica gel were heated together at 360° C. for 1.5 hours. 3.5 parts of liquid distilled off and collected and was found to contain 90% of tetramethylsilane.

Example 6

70 parts of a complex of sodium iodide and methyl aluminium dichloride were heated with 4 parts of dried silica gel at 340° C. for 1 hour. 2 parts of product distilled off and were found to contain 92% of tetramethylsilane.

Example 7

2 parts of dried silica gel and 27 parts of a complex of potassium chloride and ethyl aluminium dichloride were heated together at 330° C. for 4 hours. 1.8 parts of tetraethylsilane were distilled off and collected.

Example 8

7.9 parts of an end-stopped dimethyl polysiloxane oil of viscosity 100 centistokes at 25° C. were heated with 50 parts of the complex used in Example 1. After 2 hours heating at 320° C., 11.5 parts of product had distilled off. This was found to contain 4.6% tetramethylsilane, 86% diethyldimethylsilane and 9.2% triethylmethylsilane.

Example 9

12 parts of a gelled polysiloxane resin of 51% solids content and consisting essentially of equimolecular amounts of $PhSiO_{1.5}$ and $(CH_3)_2SiO$ units were heated at 70° C. under a pressure of 100 mm. of mercury to remove solvent therefrom. 11 parts of sodium chloride and 19 parts of ethyl aluminium dichloride were added thereto. The mixture was heated at 140° C. for 40 minutes with occasional agitation to form the complex, thereafter heated at 360° C. for 3 hours and then heated under a pressure of 1 mm. for 0.5 hour. 12 parts of distillate were collected during this period and re-distilled to give a fraction boiling between 95 and 160° C. consisting of 4.6 parts of ethylmethylsilanes and tetraethylsilane and a further fraction boiling between 50 and 170° C. at 0.5 mm. pressure consisting of a liquid containing phenyl and ethyl groups attached to the same silicon atom.

*Example 10*

47 parts of a complex of sodium chloride and ethyl aluminium dichloride were heated with 20 parts of hexamethyl disiloxane at 150° C. for 8 hours under reflux and thereafter allowed to distil. 20.2 parts of product containing 7.6 parts of ethyltrimethylsilane and 12.6 parts of unreacted hexamethyldisiloxane were collected.

*Example 11*

50 parts of the sodium bromide complex with ethyl aluminium dibromide were heated with 2.3 parts of silica gel for 2.5 hours at 290 to 360° C. 1.2 parts of distillate were collected from the reaction and this gave 1 part of tetraethylsilane after washing.

*Example 12*

30 parts of sodium chloroaluminate, 10 parts of silica and 9 parts of sodium chloride were heated to 280 to 290° C. in a vertical stirred bed reactor. 16.5 parts of methyl aluminium sesquichloride, admixed with dry nitrogen were fed into the reactor, over a period of 3 hours. During this period and for a further 15 hours during which nitrogen was passed through heating was continued at 280 to 290° C. At the end of this time it was found that 2.5 parts of tetramethylsilane had collected in the trap connected to the reactor.

*Example 13*

28 parts of sodium chloroaluminate, 9 parts of sodium chloride and 9 parts of silica were heated together in a vertical stirred bed reactor to 330° C. 17.7 parts of methyl aluminium sesquichloride were then added to the reaction mass over a period of 1.5 hours. During this period and for a further 7 hours, heating at 330° C. was continued. At the end of this time, it was found that 2.5 parts of tetramethylsilane had collected in the trap connected to the reactor.

*Example 14*

The procedure of Example 12 was repeated except that the quantity of methyl aluminium sesquichloride used was 20.0 parts and the temperature of heating was 310 to 315° C. There was obtained 2.7 parts of tetramethylsilane.

What I claim is:

1. A process for the production of alkyl silanes comprising reacting together a siliceous material selected from the group consisting of silicas, inorganic silicates, and organopolysiloxanes in which the organic radicals are members selected from the group consisting of methyl and phenyl radicals, with an alkali metal halide complex of an organo aluminium halide having the general formula $MX \cdot RAlY_2$, wherein M is an alkali metal, R is selected from the group consisting of methyl and ethyl groups, and X and Y are selected from the group consisting of chlorine, bromine, and iodine.

2. A process according to claim 1 wherein the complex is a complex of sodium chloride and ethyl aluminum dichloride.

3. A process according to claim 1 wherein the complex is a complex of lithium chloride and ethyl aluminum dichloride.

4. A process according to claim 1 wherein the complex is a complex of sodium chloride and methyl aluminum dichloride.

5. A process according to claim 1 wherein the complex is a complex of sodium iodide and methyl aluminum dichloride.

6. A process according to claim 1 wherein the complex is a complex of potassium chloride and ethyl aluminum dichloride.

7. A process according to claim 1 wherein the alkali metal halide complex is prepared in situ.

8. A process according to claim 1 wherein the reaction is carried out at a temperature of the order of 150 to 400° C.

9. A process according to claim 8 wherein the temperature is of the order of 300 to 360° C.

10. A process according to claim 1 wherein the reaction is carried out at atmospheric pressure.

11. A process according to claim 1 wherein the atomic ratio of silicon to aluminum is from 0.13:1.0 to 1.0:1.0.

12. A process according to claim 11 wherein the ratio is 0.2:1.0 to 0.5:1.0.

References Cited in the file of this patent

UNITED STATES PATENTS

| | | |
|---|---|---|
| 2,647,136 | Sauer | July 28, 1953 |
| 2,739,165 | Plueddeman | Mar. 20, 1956 |
| 2,853,504 | Jenkner | Sept. 23, 1958 |

FOREIGN PATENTS

| | | |
|---|---|---|
| 1,130,998 | France | Oct. 8, 1956 |